US009727177B2

(12) United States Patent
Tomiyasu

(10) Patent No.: US 9,727,177 B2
(45) Date of Patent: Aug. 8, 2017

(54) ELECTRONIC DEVICE WITH A TOUCH SENSOR

(75) Inventor: Kaoru Tomiyasu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/001,152

(22) PCT Filed: Feb. 23, 2012

(86) PCT No.: PCT/JP2012/001248
§ 371 (c)(1),
(2), (4) Date: Aug. 22, 2013

(87) PCT Pub. No.: WO2012/114760
PCT Pub. Date: Aug. 30, 2012

(65) Prior Publication Data
US 2013/0335373 A1 Dec. 19, 2013

(30) Foreign Application Priority Data
Feb. 23, 2011 (JP) ................... 2011-037117

(51) Int. Cl.
G06F 3/044 (2006.01)
G06F 3/01 (2006.01)
G06F 3/0488 (2013.01)
G06F 3/041 (2006.01)

(52) U.S. Cl.
CPC ............ *G06F 3/044* (2013.01); *G06F 3/016* (2013.01); *G06F 3/041* (2013.01); *G06F 3/0488* (2013.01); *G06F 2203/04105* (2013.01)

(58) Field of Classification Search
CPC ............... G06F 3/0488; G06F 3/04883; G06F 2203/04105; G06F 2203/04804; G06F 2203/04808; G06F 3/0481; G06F 3/0482; G06F 3/04886; G06F 3/016; G06F 3/041; G06F 3/0414; G06F 3/044; G06F 3/017; G06F 3/048; G06F 3/0483; G06F 3/0484
USPC ........ 345/173, 174; 178/18.01–18.03, 18.06; 715/790–803, 863
See application file for complete search history.

(56) References Cited

U.S. PATENT DOCUMENTS

| 8,209,628 | B1* | 6/2012 | Davidson | G06F 3/0487 715/790 |
| 2008/0163082 | A1* | 7/2008 | Rytivaara | 715/762 |
| 2008/0165154 | A1 | 7/2008 | Kim | |
| 2009/0036108 | A1* | 2/2009 | Cho | 455/418 |

(Continued)

FOREIGN PATENT DOCUMENTS

JP 05-181606 A 7/1993
JP 2001-202192 A 7/2001

(Continued)

OTHER PUBLICATIONS

International Search Report; PCT/JP2012/001248; May 22, 2012.
(Continued)

*Primary Examiner* — Koosha Sharifi-Tafreshi
(74) *Attorney, Agent, or Firm* — Studebaker & Brackett PC

(57) ABSTRACT

The electronic device 1 includes a touch sensor 11, a press detection unit 12 configured to detect a press on the touch sensor 11, a control unit 15 configured to, upon detecting data based on a press that satisfies a predetermined standard, any of the applications running in the background to be switched with an application running in the foreground.

16 Claims, 10 Drawing Sheets

(56) References Cited

U.S. PATENT DOCUMENTS

| | | | |
|---|---|---|---|
| 2009/0058828 A1* | 3/2009 | Jiang | G06F 3/0488 |
| | | | 345/173 |
| 2010/0079395 A1* | 4/2010 | Kim | G06F 1/1626 |
| | | | 345/173 |
| 2010/0122167 A1 | 5/2010 | Ryu | |
| 2010/0141680 A1 | 6/2010 | Nashida et al. | |
| 2010/0188348 A1 | 7/2010 | Aono | |
| 2010/0299597 A1* | 11/2010 | Shin | G06F 3/0482 |
| | | | 715/702 |
| 2011/0252381 A1* | 10/2011 | Chaudhri | G06F 3/04883 |
| | | | 715/838 |
| 2012/0147052 A1* | 6/2012 | Homma | G06F 3/044 |
| | | | 345/660 |

FOREIGN PATENT DOCUMENTS

| | | |
|---|---|---|
| JP | 2004-046792 A | 2/2004 |
| JP | 2008-165801 A | 7/2008 |
| JP | 2009-003628 A | 1/2009 |
| JP | 2010-067126 A | 3/2010 |
| JP | 2010-109587 A | 5/2010 |
| JP | 2010-118042 A | 5/2010 |

OTHER PUBLICATIONS

An Office Action; "Notice of Reason for Rejection," issued by the Japanese Patent office on Feb. 4, 2014, which corresponds to Japanese Patent Application No. 2013-500904 and is related to U.S. Appl. No. 14/001,152; with English language concise explanation.

* cited by examiner

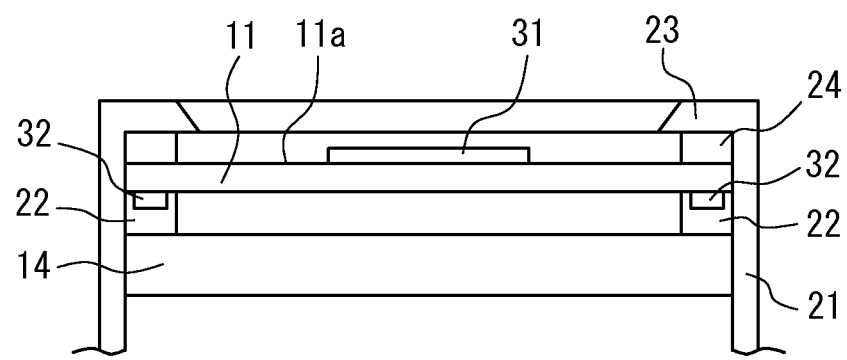
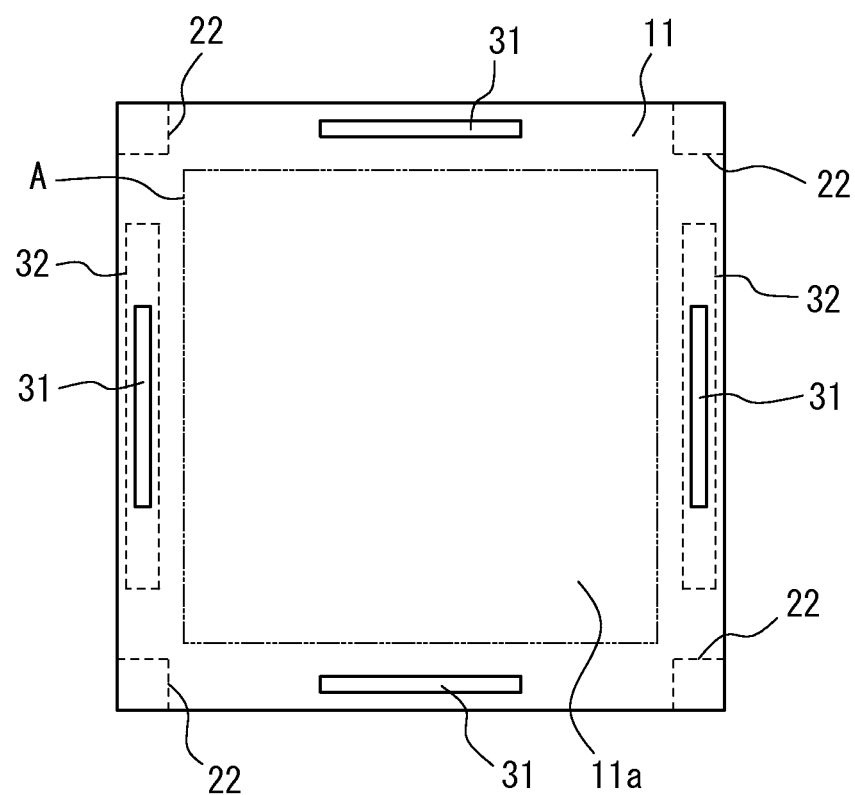

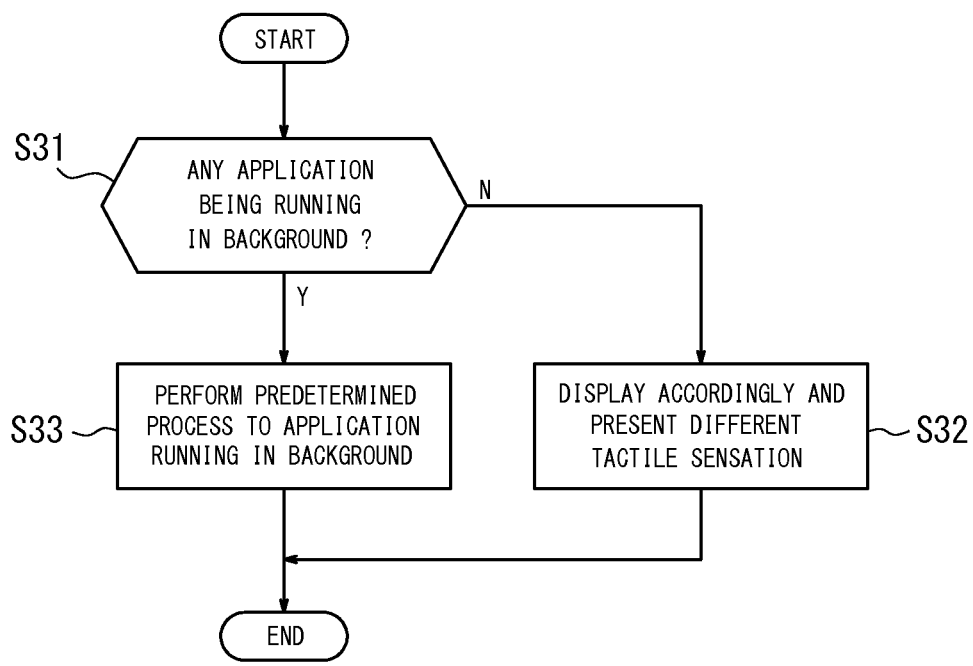

FIG. 10A
| SCHEDULE APPLICATION |
| --- |
JANUARY
| MON | TUE | WED | THU | FRI | SAT | SUN |
|---|---|---|---|---|---|---|
|  |  |  |  | 1 ×× | 2 | 3 × |
| 4 × | 5 | 6 | 7 | 8 | 9 | 10 |
| 11 | 12 | 13 | 14 ×× | 15 | 16 | 17 × |
| 18 | 19 | 20 | 21 | 22 | 23 | 24 |
| 25 | 26 | 27 ×× | 28 | 29 | 30 | 31 × |
FIG. 10B
E-MAIL APPLICATION
MAIL COMPOSITION (NEW)
To _____
TITLE _____
MESSAGE _____
[ADDRESS BOOK] [END] [SEND]
FIG. 10C
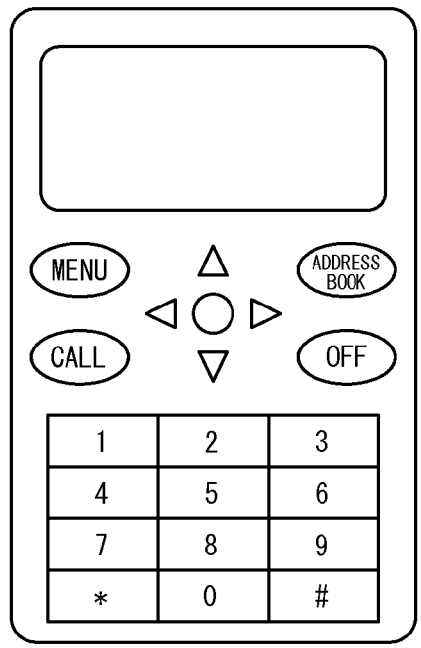
FIG. 10D
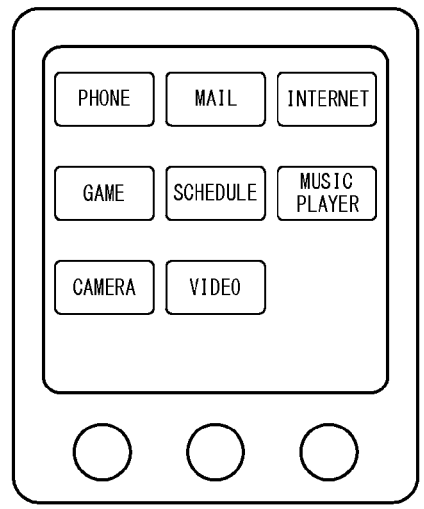

ELECTRONIC DEVICE WITH A TOUCH SENSOR

CROSS REFERENCE TO RELATED APPLICATION

This application claims priority to and the benefit of Japanese Patent Application No. 2011-37117 filed on Feb. 23, 2011, the entire contents of which are incorporated herein by reference.

FIELD

The present invention relates to an electronic device with a touch sensor, and to an electronic device configured to control application software (hereinafter appropriately abbreviated as "application") in response to the operation to the touch sensor.

BACKGROUND

In recent years, some of mobile terminals such as mobile phones have employed, as an input apparatus such as an operation unit and a switch configured to accept an operation by an operator, an input apparatus having a touch sensor such as a touch panel and a touch switch. Other than the mobile terminals, an input apparatus with a touch sensor has been widely used also for the information equipment such as calculators and ticket vending machines, home electric appliances such as microwaves, TV sets and lighting equipment, industrial equipment (FA equipment) and the like.

There are known a variety of types of those touch sensors, such as a resistive film type, a capacitive type, an optical type and the like. Typically, small electronic devices such as mobile phones and the like usually have a touch panel configured to display keys such as a numerical keypad, icons and the like as an object on a display unit and detect a touch by the operator on the object using a touch sensor.

The electronic device having such a touch panel can configure a various types of user interfaces by displaying an object depending on the application to be started. Thus, an electronic device with a touch panel has rapidly spread for its easy-to-understand operation and user-friendliness.

As for the technology relating to an electronic device with a touch panel, various researches and developments have been in progress. For example, there is suggested a technology to prevent a mistake in operating a touch panel by preventing pressing mistakes (see Patent Document 1), a technology to adjust the sensitivity of a touch panel and suitable materials (see Patent Documents 2 and 3). Further, there is suggested a technology to evacuate a job when an application is switched by a touch panel (see Patent Document 4) and moreover, a technology to display a short cut key on a touch panel (see Patent Document 5).

CITATION LIST

Patent Document 1: Japanese Patent Laid-Open No. 2001-202192
Patent Document 2: Japanese Patent Laid-Open No. 2004-046792
Patent Document 3: Japanese Patent Laid-Open No. 2008-165801
Patent Document 4: Japanese Patent Laid-Open No. H5-181606
Patent Document 5: Japanese Patent Laid-Open No. 2009-003628

SUMMARY

The above-described electronic device may be installed with a plurality of various applications. Such an electronic device may be used for various purposes when it is installed with a plurality of applications.

An electronic device that runs one application at a time (single-tasking), when an application is started on an electronic device, has been used in the past, however, now many of the electronic devices can run a plurality of applications at a time (multi-tasking). In a single-tasking electronic device, when an application is switched, the running application is once finished, and the application to be run next is started. In a multi-tasking electronic device, without finishing the running application as far as the resource permits, a plurality of applications can be started one after another to switch to a desired application.

In the case of a multi-tasking electronic device, when a plurality of applications are started, usually, one application is run in the foreground and the other application is run in the background. Thus in the case of such an electronic device, during running of a plurality of applications, if the operator wants to switch between the other application running in the background and the application running in the foreground, the operator needs to perform an operation for switching.

The present invention in light of the above-mentioned problem is to provide an electronic device with a touch sensor, capable of controlling an application running in the background.

An electronic device according to a first aspect of the invention to achieve the above-mentioned matter includes:
a touch sensor;
a press detection unit configured to detect a press on the touch sensor; and
a control unit configured to control, upon detecting data based on a press that satisfies a predetermined standard, any of applications running in the background to be switched with an application running in the foreground.

According to a second aspect, in the electronic device according to the first aspect, the control unit controls, each time the control unit detects the data based on the press that satisfies the predetermined standard, any of the applications running in the background to be sequentially switched with an application running in the foreground, in accordance with a predetermined order.

According to a third aspect, in the electronic device according to the first aspect, the control unit controls, upon detecting the data based on the press that satisfies the standard of a predetermined stage, an application corresponding to the standard of a predetermined stage among those running in the background to be switched with the application running in the foreground.

An electronic device according to a fourth aspect of the invention includes:
a touch sensor;
a press detection unit configured to detect a press on the touch sensor; and
a control unit configured to control, upon detecting data based on a press that satisfies a predetermined standard, any of applications running in the background to perform a predetermined process.

According to a fifth aspect, in the electronic device according to the fourth aspect, the control unit controls, upon detecting the data based on the press that satisfies the standard of a predetermined stage, an application corresponding to the standard of the predetermined stage among those running in the background to perform the predetermined process.

An electronic device according to a sixth aspect of the invention to achieve the above-mentioned object includes:
a touch sensor;
a press detection unit configured to detect a press on the touch sensor; and
a control unit configured to control, upon detecting data based on a press that satisfies a predetermined standard, any of inactive applications to be activated.

According to a seventh aspect, in the electronic device according to the sixth aspect, the control unit controls, each time the control unit detects the data based on the press that satisfies the predetermined standard, any of the inactive applications to be sequentially activated in accordance with a predetermined order.

According to an eighth aspect, in the electronic device according to the sixth aspect, the control unit controls, upon detecting the data based on the press that satisfies the standard of the predetermined stage, an application corresponding to the standard of the predetermined stage among inactive applications to be activated.

An electronic device according to a ninth aspect of the invention includes:
a touch sensor;
a press detection unit configured to detect a press on the touch sensor; and
a control unit configured to control, upon detecting data based on a press that satisfies a predetermined standard, any of inactive applications to perform a predetermined process.

According to a tenth aspect, in the electronic device according to the ninth aspect, the control unit controls, upon detecting the data based on the press that satisfies the standard of a predetermined stage, an application corresponding to the standard of the predetermined stage among inactive applications to perform the predetermined process.

The present invention provides an electronic device with a touch sensor, capable of controlling an application running in the background, in which convenience of the operator who operates the electronic device will be dramatically improved.

BRIEF DESCRIPTION OF DRAWINGS

FIGS. 2A and 2B illustrate one example of a mounting structure of the electronic device in accordance with one embodiment;

FIG. 6 is a flow chart illustrating a detailed application control process by the electronic device in accordance with one embodiment;

FIGS. 10A-10D illustrate an application control by an electronic device in a related example and an interface of the electronic device.

DESCRIPTION OF EMBODIMENTS

Figure 1:
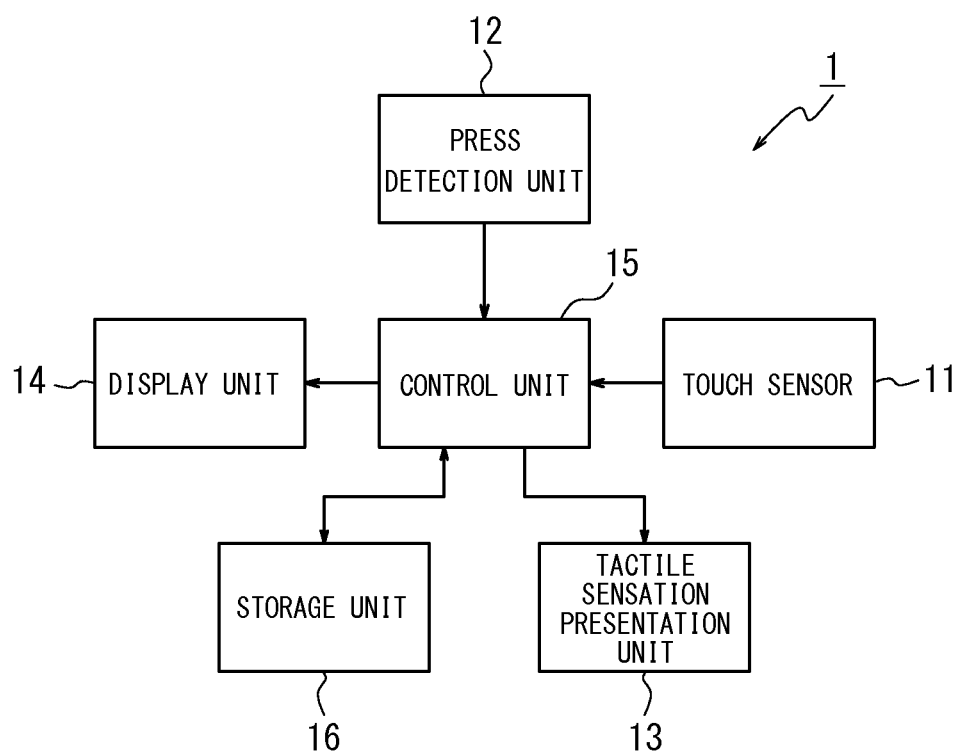
FIG. 1 is a block diagram illustrating a schematic configuration of an electronic device in accordance with a first embodiment of the present invention.

In a related example of multi-tasking, suppose that a schedule management application and an e-mail function application were installed on an electronic device. FIGS. 10A and 10B schematically illustrate a screen displayed on a display unit of the electronic device during running of these applications. FIG. 10A illustrates a state where, in the electronic device, a schedule management application is being run in the foreground and FIG. 10B illustrates a state where, in the electronic device, an e-mail function application is being run in the foreground. In this manner, particularly in most of small electronic devices, a user interface in which one application occupies one screen is configured.

Here, as illustrated in FIG. 10A, for example, the operator may, during running of a schedule management application in the foreground, want to use an e-mail function to check with other person about his/her availability. Further, on the other hand, the operator may, after running the e-mail application of FIG. 10B in the foreground and check with the other person about his/her availability by e-mail, want to use the schedule management function again. As described above, with a multi-tasking electronic device, the schedule management application and the e-mail function application run simultaneously. That is, the operator does not need to finish the applications being already run each time to switch between them.

However, when these two applications are switched therebetween, for example, in the case of an electronic device having an interface illustrated in FIG. 10C, the operator needs to select a desired application to be started by pressing, for example, a menu key (MENU) to run the application in the foreground. The electronic device illustrated in FIG. 10C may have keys such as a numerical keypad configured by mechanical switches and buttons. However, even with the electronic device having the above-described touch panel, the operator needs to perform an operation to select a desired application to be started.

In FIG. 10D, icons for starting each application are displayed on the screen of the mobile terminal with a touch panel. In such a terminal, to switch between applications, the operator needs to perform any operation to display a selection screen as illustrated in FIG. 10D during running of an application and to select an icon, thereby switching to a desired application.

Similarly to the above described example of a multi-tasking electronic device, in a single-tasking electronic device, the operator also needs to perform an operation for switching between applications. As described above, a single-tasking electronic device is not configured to run applications simultaneously, thus when applications are switched therebetween in a single-tasking electronic device, the operator needs to finish the running application once and subsequently start a desired application. In this case, it is obvious that an operation for finishing the running application and an operation for starting the next application are needed.

In this manner, both for single-tasking electronic device and multi-tasking electronic device, switching between applications is usually a time-consuming operation that requires a plurality of procedures for operators. When frequent switchings between applications are needed, such an operation may cause considerable stress. For example, the operator may need to switch alternately between applications illustrated respectively in FIGS. 10A and 10B in a frequent manner. In this case, it is very time consuming for the operator to repeat the same application switching operation several times.

Recently, many mobile terminals have a sound reproduction function such as a music player and the like. When such a terminal is a multi-tasking terminal, the other application such as, for example, a web browser can be run while playing music. However, the operator may want to stop playing the music player when he/she is browsing an internet site by the Web browser application while playing the music. In this case, the operator needs to switch once to the music player application running in the background. Thus, in such the electronic devices, when the operator wants to perform an operation on the multi-tasking electronic device to run an application in the background, he/she needs to switch the application to be run in the foreground. Such switching of application may be troublesome and time consuming for the operator.

In light of the above-mentioned problem, Embodiments of the present invention will now be described with reference to the accompanying drawings.

First Embodiment

FIG. 1 is a function block diagram illustrating a schematic configuration of an electronic device with a touch sensor in accordance with a first embodiment of the present invention. The electronic device in accordance with the present embodiment may be, for example, mobile phones, PDA (Personal Digital Assistant), smart phones, tablet electronic devices, mobile terminals such as game machines, or terminal equipment used for ATM installed in banks, ticket vending machines installed in stations and the like. That is, the present embodiment may be applied to any electronic device if the device accepts a touch operation by the operator through a touch sensor.

As illustrated in FIG. 1, an electronic device 1 in accordance with the present embodiment includes a touch sensor 11, a press detection unit 12, a tactile sensation presentation unit 13, a display unit 14, a control unit 15 and a storage unit 16.

The touch sensor 11 is a sensor having a touch face, and detects that an operator's finger and the like has touched the touch face. The touch sensor 11 may be configured using a resistive type, a capacitive type, an optical type and the like. Further, the touch sensor 11 may be a transmission type, and disposed on the front surface of the display unit 14, thereby being used as a sensor configured to detect that the operator has touched an object such as a key and a button displayed on the display unit 14 (a so-called touch panel).

The press detection unit 12 detects a press on the touch sensor 11, and is configured using, for example, strain gauge sensors, piezoelectric elements and the like whose physical or electrical characteristics (strain, resistance, voltage, etc.) vary in response to the press. When the press detection unit 12 is configured using, for example, a piezoelectric element and the like, in the piezoelectric element of the press detection unit 12, a voltage (voltage value), which is an electrical characteristic, varies in response to the magnitude of the load (force) (or the rate of changing load (force) (acceleration)) for the press on the touch sensor 11. The press detection unit 12 sends the magnitude of the voltage (voltage value (hereinafter referred to merely "data")) to the control unit 15. The control unit 15 obtains (detects), when the press detection unit 12 sends the data to the control unit 15 or when the control unit 15 detects the data about the piezoelectric element from the press detection unit 12, data. That is, the control unit 15 obtains (detects) the data based on a press on the touch sensor 11. In other words, the control unit 15 obtains (detects) the data based on a press from the press detection unit 12.

The tactile sensation presentation unit 13 causes the touch sensor 11 to vibrate. The tactile sensation presentation unit 13 is configured using, for example, a piezoelectric element and the like.

On the display unit 14, an object of an input button such as a push button switch (push-type button switch) and the like is depicted and displayed. The display unit 14 is configured using, for example, a liquid crystal display panel, an organic EL display panel and the like. Moreover, the display unit 14 displays not only such a user interface, but also various pieces of information to be presented to the operator depending on each application (that is, a display screen constituting an application).

The control unit 15 controls the whole electronic device 1. Particularly, in the present embodiment, the control unit 15 performs various controls including a control of each function unit, depending on various applications installed. For example, when a web browser application is started, various processes relating to the functions as a web browser are performed. In addition, the control unit of the electronic device performs various processes depending on the application.

The storage unit 16 may be configured using a memory and the like. The storage unit can store various applications and various pieces of information that have been inputted, and serve as a work memory as well. Particularly, in the present embodiment, the storage unit 16 previously stores (installs) various applications to be run on the electronic device 1.

FIGS. 2A and 2B are diagrams illustrating an example of a mounting structure of the electronic device 1 illustrated in FIG. 1. FIG. 2A is a cross-sectional view of one portion of the electronic device 1 and FIG. 2B is a plan view of the portion. As illustrated in FIG. 2A, in the electronic device 1 in accordance with the present embodiment, the display unit 14 is accommodated and held in the housing 21. Further, the touch sensor 11 is held on the display unit 14 through an insulator 22 formed by an elastic member. In the electronic device 1 in accordance with the present embodiment, the display unit 14 and the touch sensor 11 are respectively formed into a rectangular shape in a planar view. In the present embodiment, the touch sensor 11 is held on the display unit 14 through insulators 22 disposed respectively at the four corners away from the display region A of the display 14 as illustrated in FIG. 2B with a virtual line.

The housing 21 is provided with an upper cover 23 to cover the surface region of the touch sensor 11 away from the display region of the display unit 14, and insulators 24 made of an elastic member are disposed between the upper cover 23 and the touch sensor 11.

In the touch sensor 11 illustrated in FIG. 2, the surface member having a touch face 11a is configured using, for example, a transparency film or glass, and the back face member is configured using glass or acrylic. The touch sensor 11 is configured so that, when the touch face 11a is pressed, the pressed portion bends (warps) slightly in response to the pressing force, or the body itself bends slightly.

On the surface of the touch sensor 11, strain gauge sensors 31 for detecting a press (pressing force) applied to the touch sensor 11 are attached respectively, in the vicinity of each side covered by the upper cover 23, with an adhesive and the like. Further, on the back face of the touch sensor 11, piezoelectric vibrators 32 configured to cause the touch sensor 11 to vibrate are attached respectively, in the vicinity of two opposing sides, with an adhesive and the like. That is, in the electronic device 1 illustrated in FIGS. 2A and 2B, the press detection unit 12 illustrated in FIG. 1 is configured using four strain gauge sensors 31, and the tactile sensation presentation unit 13 is configured using two piezoelectric vibrators 32. Further, the tactile sensation presentation unit 13 causes the touch sensor 11 to vibrate, thereby causing the touch face 11a to vibrate. In FIG. 2B, the housing 21, the upper cover 23 and the insulator 24 illustrated in FIG. 2A are omitted.

Next, control of the application in the electronic device in accordance with the present embodiment is described.

Figure 3:
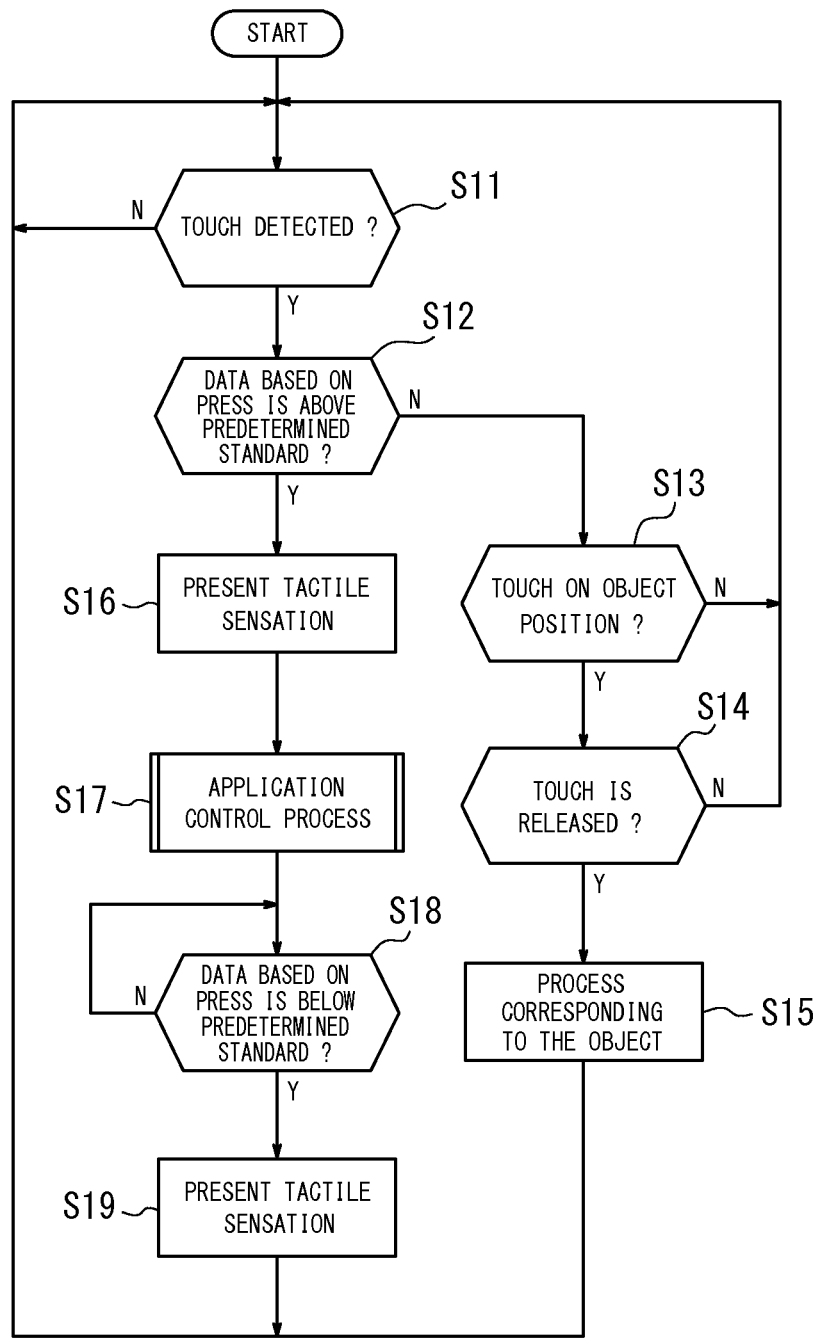
FIG. 3 is a flow chart illustrating a process by the electronic device in accordance with one embodiment.
Figure 4:
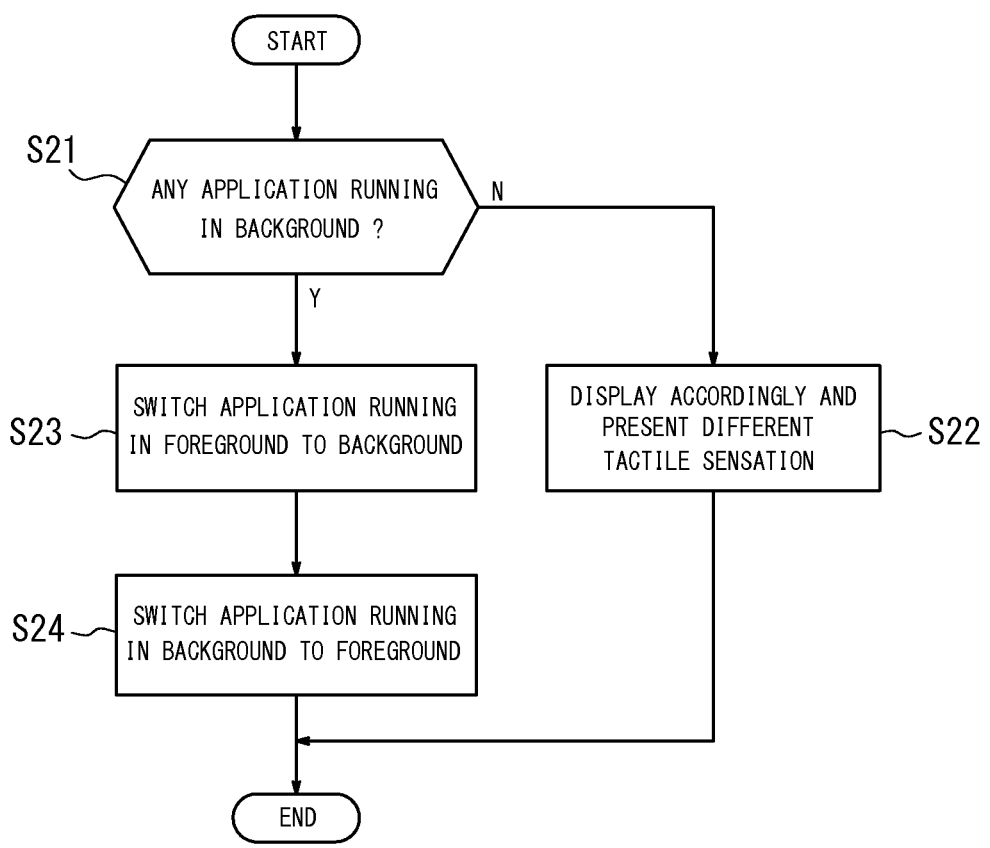
FIG. 4 is a flow chart illustrating a detailed application control process by the electronic device in accordance with one embodiment.

FIGS. 3 and 4 are flow charts illustrating control of an application in response to an operation to the electronic device 1 in accordance with the first embodiment. The electronic device 1 in accordance with the present embodiment, during acceptance of a usual operation through a touch on the touch sensor 11, upon detecting data based on a press that satisfies a predetermined standard on the touch sensor 11, switches between any of the applications running in the background and the application running in the foreground.

The flow chart illustrated in FIG. 3 describes a case where the position on which a touch operation is detected by the touch sensor 11 corresponds to an icon (object) configured to start an application, and a usual process of the electronic device 1 for starting the application. In this case, before starting the process illustrated in FIG. 3, the electronic device 1 shall start any application in the foreground beforehand. The application to be started may be any application such as above-described schedule management application and an e-mail function application.

When starting the process illustrated in the flow chart of FIG. 3, before detecting a touch operation by the operator to the touch face of the touch sensor 11, an object such as an icon and the like for starting an application and a key and the like for performing an operation shall be displayed on the display unit 14 of the electronic device 1. The object in accordance with the present embodiment may be an image that suggests a position (region) for accepting a touch operation to the operator. For example, as an image of the object, an image representing a state where the numbers and characters are depicted on a key top is displayed on the display unit 14. Further, the object in accordance with the present embodiment may be an image that suggests a position (region) on which a touch for performing an operation to the application running in the foreground is detected to the operator. For example, as an image of object, an image of icon showing an application to be started is displayed on the display unit 14. In this case, which object is displayed on the display unit 14 and how it displayed thereon depend on the application running in the foreground at that time.

When the process of the electronic device 1 in accordance with the present embodiment is started, the control unit 15 monitors whether or not the touch sensor 11 has been touched and data based on a press on the touch sensor 11 as well (step S11). At step S11, when the touch sensor 11 detects a touch (touch operation) by a pressing object (pressing matter) such as an operator's finger and a stylus pen, the process moves to step S12.

At step S12, the control unit 15 determines whether or not the data based on the press on the touch sensor 11 is increased by the press of the touch sensor 11 by the operator and satisfies a predetermined standard. In the control unit 15, for example, the average value of outputs from the four strain gauge sensors 31 of the press detection unit 12 may be used as data based on a press. Here, it is preferable that, as the data based on the press that satisfies the predetermined standard, using the press by the operator for a usual press operation as a standard, a value which is slightly higher than the standard may be previously set, and the value may be changed thereafter. Further, in order to prevent the data based on the press from being determined as satisfying the predetermined standard when the operator softly touches the touch sensor 11 by accident, setting a very low value as the predetermined standard is avoided. Moreover, in order to give a sense of pressure for a real tactile sensation described below to the operator, considering a usual press by the intention of the operator (e.g. an average value), setting a very low value as the predetermined standard is avoided.

In the case where the touch sensor 11 detects a touch at step S11 and the control unit 15 does not detect the data based on the press that satisfies the predetermined standard at step S12, the process proceeds to step S13. At step S13, the control unit 15 determines whether or not the position of the touch detected by the touch sensor 11 corresponds to the position of the object displayed on the display unit 14. At step S13, when the position of the touch detected by the touch sensor 11 does not correspond to the position of the object, the operator has not touched the position on which a predetermined control is performed by the application, thus the process returns to step S11 and the control unit 15 continues the process. On the other hand, at step S13, when the position of the touch detected by the touch sensor 11 corresponds to the position of the object, the control unit 15 determines whether or not detection of the touch by the touch sensor 11 has ceased (step S14).

When the touch has not been released yet (that is, the operator continues the touch operation to the touch sensor 11) at step S14, the process returns to step S11 and the control unit 15 continues the process. On the other hand, when the touch is released at step S14 (that is, the operator's finger is released from the touch sensor 11), the control unit 15 performs a process corresponding to the object on the position on which the touch is detected (step S15). The process for that is defined by the application running in the foreground at that time. For example, when release of a touch is detected on a position of an object accepting an operation for inputting numbers or characters during running of, for example, an e-mail application, a process for displaying the numbers or characters on the display unit 14 is performed. Further, for example, when release of a touch is detected on a position of an icon as an object configured to start an application, a process for starting the application is performed.

Thus, the electronic device 1 in accordance with the present embodiment detects a release of touch (detection of a tap) to the touch sensor 11 on the position of object displayed on the display unit 14, thereby performing a process corresponding to the object.

On the other hand, if the control unit 15 detects the data based on the press that satisfies the predetermined standard when the touch sensor 11 detects a touch at step S11, process proceeds to step S16. At step S16, in order to notify the operator of detection of an operation by a press based on the operator's intention, which is different from a usual touch operation, the control unit 15 drives the tactile sensation presentation unit 13 with a predetermined drive signal and causes the touch sensor 11 to vibrate with a preset predetermined vibration pattern to present a first tactile sensation. That is, the control unit 15 controls, upon detecting the data based on the press that satisfies the predetermined standard during detection of a touch by the touch sensor 11, the drive of the tactile sensation presentation unit 13 to present a tactile sensation to the object pressing the touch face. The tactile sensation presentation unit 13 drives, for example, two piezoelectric vibrators 32 in phase.

In order to present a real tactile sensation to the operator at step S16, the electronic device 1 performs the process described below to stimulate the operator's sense of touch while stimulating the operator's sense of pressure. That is, the electronic device 1 stimulates the sense of pressure until the data based on the press on the touch sensor 11 satisfies the standard presenting a tactile sensation, and when the data based on the press satisfies the standard, drives the piezoelectric vibrator 32 with a predetermined drive signal to cause the touch face 11a to vibrate, and stimulates the sense of touch, thereby allowing the electronic device 1 to present a tactile sensation which is the same as that obtained when pressing a push button switch (push-type button switch) to the operator. Therefore, the operator can, even with a push button switch depicted on the touch sensor, obtains a real tactile sensation as in the case when operating a real push button switch, and at the same time, may perform an input operation to the touch sensor 11 as well. Moreover, the operator may perform an operation with a sense of "having touched" to the touch sensor 11, and thus operation mistakes may be prevented.

The above-described drive signal for presenting a tactile sensation, that is, a constant frequency, cycle (wavelength), waveform and amplitude stimulating the sense of touch can be appropriately set depending on the tactile sensation to be presented. For example, when a tactile sensation of pressing a button represented by a metal dome switch used for a mobile terminal is presented, the tactile sensation presentation unit 13 is driven by, for example, a drive signal of one Sin wave cycle at a constant frequency of 170 Hz. The tactile sensation presentation unit 13 is driven by such a drive signal, and the touch face 11a is vibrated about 15 m while applying a reference press Pth, thereby allowing a real tactile sensation to be presented as in the case where the operator presses a real key to the operator.

When a tactile sensation is presented at step S16, the control unit 15 performs an application control process of step S17. FIG. 4 is a flow chart illustrating the application control process at step S17 in FIG. 3 in detail. In the application control process according to the present embodiment illustrated in FIG. 4, the control unit 15 first determines whether or not there is an application running in the background other than the application running in the foreground (step S21).

When there is no application running in the background at step S21, there is no application to be switched to the foreground. In this case, the control unit 15 displays a message indicating "no application running in the background" on the display unit 14 so that the operator will learn it (step S22). In that case, the control unit 15 may drive the tactile sensation presentation unit 13 to present a tactile sensation that is different from the above-described tactile sensation of pressing a button, thereby notifying the operator of no application running in the background. Thus, after notifying the operator of no application running in the background at step S22, the control unit 15 finishes the application control process of step S17.

On the other hand, if there is an application running in the background at step S21, the control unit 15 transfers the application running in the foreground to the background (step S23). Next, the control unit 15 switches the application running in the background to be run the foreground (step S24), and ends the application control process of step S17.

At step S24, the control unit 15 controls any of the applications running in the background to be switched with the application running in the foreground. Here, when there is only one application running in the background, an application to be switched is automatically specified. However, when there are a plurality of applications running in the background, the control unit 15 needs to specify which of the applications to be switched with the application running in the foreground. Various methods are considered for specifying, among a plurality of applications running in the background, an application to be run in the foreground.

For example, while a specific application is running in the foreground, an application that is likely to be cooperative with (or to be used simultaneously with) the application may be previously defined, and the defined application may be run in the foreground during the process at step S17. Further, when a plurality of applications are running in the background, the order of applications to be transferred to the foreground may be previously defined as a predetermined order. In this case, each time the process of step S17 occurs, the control unit 15 controls each application to be sequentially switched with the application running in the foreground in accordance with the order.

In addition, at step S12, when the control unit 15 detects the data based on the press that satisfies the predetermined standard, the data based on a press may be detected according to stage. That is, for example, as to the data based on the press that satisfies the predetermined standard, standard of some predetermined stages such as a first stage, a second stage and a third stage, each standard being increased gradually as stage proceeds, may be previously defined. In this case, when the data based on the press is detected according to the stage, measures for determining a stage of data based on a press in a predetermined short period of time (e.g. one second) after the data based on the press satisfies the predetermined standard may be taken. Further, an application corresponding to each standard of the predetermined stages may be previously defined, such as, for example, the standard of data based on a press of the first stage, the standard of the second stage, the standard of the third stage may respectively correspond to a schedule management application, an e-mail function application and a music player application. With such a setting, the control unit 15 can control, upon detecting the data based on the press that satisfies the standard of the predetermined stage at step S12, among the applications running in the background, the application corresponding to the standard of the predetermined stage to be switched with the application running in the foreground at step S17.

The control unit 15 determines, after performing a control process of the application at step S17, whether or not the data based on the press on the touch sensor 11 is below a predetermined standard (step S18). That is, at step S18, the control unit 15 determines whether or not the operator's force for pressing the touch sensor 11 has been weakened.

When the data based on the press on the touch sensor 11 is below the predetermined standard at step S18, the control unit 15 drives the tactile sensation presentation unit 13 with a predetermined drive signal and causes the touch sensor 11 to vibrate with a predetermined vibration pattern that has been previously set to present a second tactile sensation (step S19). The tactile sensation presented here is to notify the operator that the application control process has been appropriately performed. The second tactile sensation may be the same as the first tactile sensation presented at step S16. Alternatively, when the first tactile sensation is the above-described tactile sensation of pressing a button, the second tactile sensation may be different from the first tactile sensation, and may be a tactile sensation of lifting a finger and the like from a button.

For example, the frequency of the drive signal for presenting a first tactile sensation (for the tactile sensation of pressing a button) may be 170 Hz and the frequency of the drive signal for presenting a second tactile sensation may be 125 Hz. Thus, as a second tactile sensation, as in the case where a finger is released from a real key, a real tactile sensation that is different from the tactile sensation of pressing a button can be presented to the operator. In this manner, also when a press is released after a tactile sensation of pressing a button is presented, as in the case of pressing, the tactile sensation presentation unit 13 is driven by a predetermined drive signal and the touch sensor 11 is vibrated by a preset predetermined vibration pattern, thereby allowing a tactile sensation of releasing the press to be presented after a button is pressed. Therefore, combining with a tactile sensation of pressing a button, a real tactile sensation of releasing a finger and the like from a button, which is closer to the tactile sensation obtained by pressing a push button switch, can be presented to the operator.

Figure 5A:
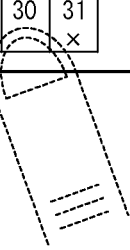
FIGS. 5A and 5B illustrate a process by the electronic device in accordance with one embodiment.
Figure 5B:
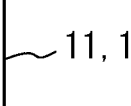

FIGS. 5A and 5B are diagrams illustrating a process by the electronic device 1 in accordance with the first embodiment. FIG. 5A illustrates an example in which the electronic device 1 is running a schedule management application in the foreground. In this case, the electronic device 1 is running an e-mail application in the background. As illustrated in FIG. 5A, the electronic device 1 is running a schedule management application in the foreground, and thus accepts a touch operation by the operator and performs a process corresponding to the operation in the schedule management application. That is, in the state illustrated in FIG. 5A, the operator performs a touch operation to the touch sensor 11 (in a state where an object is displayed on the display unit 14) of the electronic device 1, thereby allowing the schedule management application to perform a predetermined process. For example, the operator can display a detailed schedule for the day or input a schedule such as an event for the day by touching a date portion.

Under such a situation, as illustrated in FIG. 5A, when the touch face of the touch sensor 11 is pressed and the control unit 15 detects data based on a press that satisfies a predetermined standard, the electronic device 1 runs, as illustrated in FIG. 5B, the e-mail application that has run in the background in the foreground. That is, if the operator wants to perform an operation to the e-mail application running in the background during running of the schedule management application in the foreground as illustrated in FIG. 5A, the operator only needs to operate any position on the touch sensor 11 so that data based on a press that satisfies a predetermined standard will be detected.

With such a pressing operation, the e-mail application is switched to be run in the foreground as illustrated in FIG. 5B, and thus the operator can immediately perform an operation to the application running in the background. After the e-mail application is switched to the foreground in this manner, the electronic device 1 accepts a touch operation by the operator, thereby performing a process corresponding to the operation in the e-mail application. For example, when the operator accepts an operation of inputting a character, the electronic device 1 may display the character and the like. Further, when the touch face of the touch sensor 11 is pressed again in the state illustrated in FIG. 5B and the control unit 15 detects data based on a press that satisfies a predetermined standard, the electronic device 1 returns the schedule management application running in the background to the foreground, as illustrated in FIG. 5A.

In FIG. 5, description has been given on the assumption that an e-mail application has been previously defined as an application cooperative with a schedule management application. However, as described above, for a plurality of applications already installed, an order of transferring the applications running in the background to the foreground may be previously defined as a predetermined order. In this case, each time the touch face of the touch sensor 11 is pressed and the control unit 15 detects data based on a press that satisfies a predetermined standard, the electronic device 1 sequentially switches to the application running in the foreground in accordance with the predetermined order. Thus the operator can sequentially and quickly switch an application running in the background to be run in the foreground.

Further, as described above, when the control unit 15 detects data based on a press that satisfies a predetermined standard, it may detect data based on a press according to stage such as a first stage and a second stage, and an application corresponding to each standard of a predetermined stage may be previously defined. In this case, when the touch face of the touch sensor 11 is pressed and data based on a press that satisfies a standard of a predetermined stage is detected, the electronic device 1 switches, among applications running in the background, an application corresponding to the predetermined standard with an application running in the foreground.

For example, with a schedule management application corresponding to the standard of data based on a press of the first stage, if the data based on the press that satisfies the standard of the first stage is detected during running of a communication application of mobile phone in the foreground, for example, the electronic device 1 switches the schedule management application to the foreground. Alternatively or additionally, with an e-mail function application corresponding to the standard of data based on a press of the second stage, if the data based on the press that satisfies the standard of the second stage is detected during running of a communication application of a mobile phone in the foreground, the electronic device 1 switches the e-mail function application to the foreground.

Second Embodiment

Next, the second embodiment of the present invention will be described. In the second embodiment, the application control process of step S17 in FIG. 3 according to the first embodiment is altered. Therefore, the electronic device in accordance with the second embodiment can be operated by the same configuration as that of the electronic device 1 described in the first embodiment, and thus the same description as that for the first embodiment will be appropriately omitted.

The electronic device 1 according to the above-described first embodiment switches, upon detecting data based on a press that satisfies a predetermined standard, between any of the applications running in the background and the application running in the foreground. On the other hand, the electronic device 1 in accordance with the second embodiment allows, upon detecting the data based on the press that satisfies the predetermined standard, any of the applications running in the background to perform a predetermined process while leaving the application running in the foreground as it is.

FIG. 6 is a flow chart in accordance with the present embodiment, illustrating the details of the application control process of step S17 in FIG. 3. In the application control process according to the present embodiment illustrated in FIG. 6, the control unit 15 first determines whether or not there is an application running in the background other than the application running in the foreground (step S31).

If no application running in the background is detected at step S31, there is no application running in the background to be controlled. In this case, the control unit 15 displays a message indicating "no application running in the background" on the display unit 14 to notify the operator of it (step S32). Further, in that case, the control unit 15 may drive the tactile sensation presentation unit 13 to present a tactile sensation that is different from the tactile sensation of pressing a button, thereby notifying the operator of no application running in the background. Thus, after notifying the operator of no application running in the background at step S32, the control unit 15 ends the application control process of step S17.

On the other hand, if there is an application running in the background at step S31, the control unit 15 controls, while leaving the application running in the foreground as it is, the application running in the background to perform a predetermined process (step S33). After that, the control unit 15 ends the application control process of step S17.

At step S33, the control unit 15 controls any of the applications running in the background to perform a predetermined process. Here, when there is only one application running in the background, an application to be controlled for performing a predetermined process is automatically specified.

Here, a predetermined process to be performed by the application running in the background when data based on a press that satisfies a predetermined standard is detected is previously defined. As an example, when the application running in the background is an alarm, the above-described predetermined process may be a process for stopping the alarm. As another example, if the application running in the background is a music player, the above-described process may be a process for stopping the music being played by the music player or, when the music play is stopped, for starting the play again, or for selecting music to be played next to the music being played. When the data based on the press that satisfies the predetermined standard is detected, different predetermined processes also may be designated depending on the aspect of detecting data based on a press.

For example, when the application running in the background is a music player, a predetermined process for the case where data based on a press that satisfies a predetermined standard is detected for a short period of time (that is, a short press) may be a process for selecting music to be played next to the music being played. A predetermined process for the case where data based on a press that satisfies a predetermined standard is detected for a relatively long period of time (that is, a long press) may be a process for stopping the music being played by the music player. When such different predetermined processes are defined, such processes may be defined, based not only on the length of time for detecting data based on a press that satisfies a predetermined standard, but on the number of times of detection of data based on pressing in a predetermined short period of time such as a quick twice detection (double tapping) and a quick three-time detection (triple tapping).

Moreover, when a plurality of applications are running in the background, the control unit 15 should specify which application to perform a predetermined process. Thus, as in the case of the above-described first embodiment, various methods may be considered for specifying, among a plurality of applications running in the background, an application that performs a predetermined process.

For example, during running of a specific application in the foreground, an application that is likely to be cooperative with (or to be used concurrently with) the application may be defined. In this case, in the process of step S17, the control unit 15 controls the application defined to perform a predetermined process while the application is running in the background. Further, when a plurality of applications are running, the order of applications for performing a predetermined process while they are running in the background may be previously defined as a predetermined order. In this case, each time the process of step S17 occurs, the control unit 15 controls, in accordance with the order, the application running in the background to perform a predetermined process while leaving the application running in the foreground as it is.

As in the case of the first embodiment, at step S12, the control unit 15 may, when it detects data based on a press that satisfies a predetermined standard, detect the data based on the press according to stage. That is, for example, as for the data based on the press that satisfies a predetermined standard, a plurality of standards, each standard is set gradually higher as stage progressed, may be previously defined. Further, an application corresponding to each standard of these predetermined stages may be previously defined, such as, for example, the standard of data based on a press of the first stage, the standard of data based on a press of the second stage, the standard of data based on a press of the third stage corresponding respectively to a schedule management application, an e-mail function application and a music player application. With such a setting, when the control unit 15 controls, upon detecting the data based on the press that satisfies the standard of the predetermined stage at step S12, among the applications running in the background, an application corresponding to the standard of the predetermined stage to perform a predetermined process at step S17.

Figure 7A:
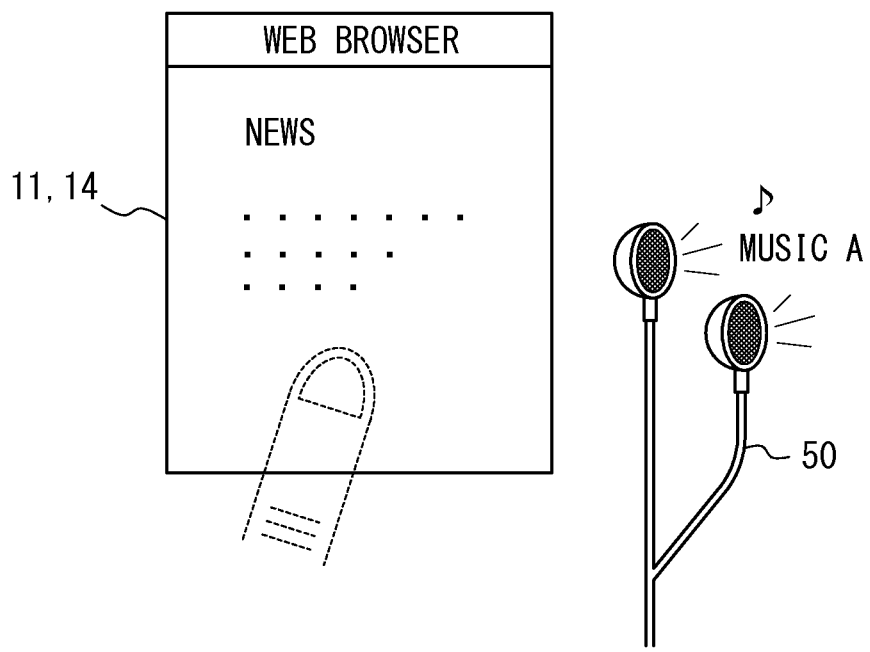
FIGS. 7A and 7B illustrate a process by the electronic device in accordance with one embodiment.
Figure 7B:
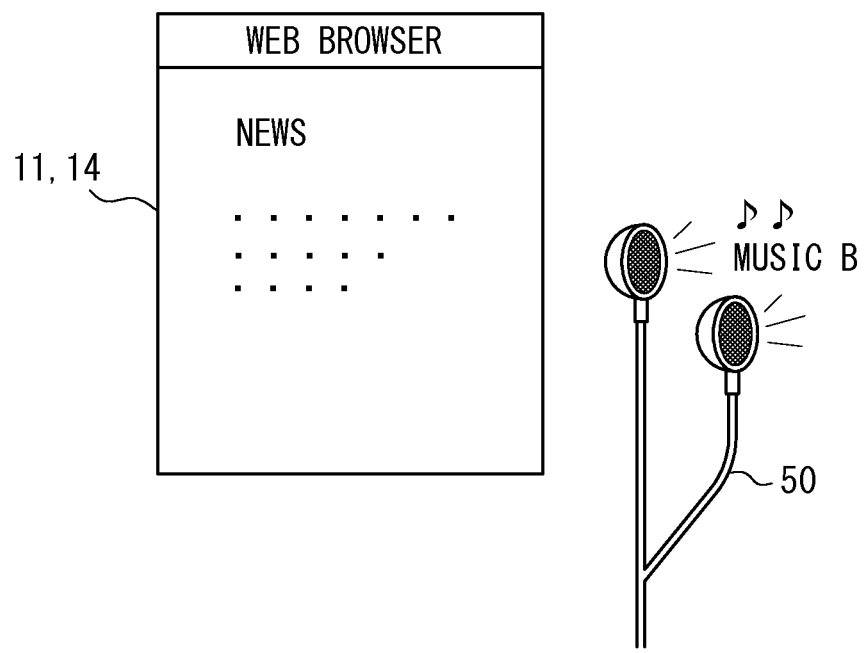

FIGS. 7A and 7B are drawings illustrating a process by the electronic device 1 in accordance with the second embodiment. FIG. 7A illustrates the case where the electronic device 1 runs a web browser application in the foreground. FIG. 7A illustrates a state where the operator runs a web browser application by the electronic device 1 to browse the internet news site. In this case, the electronic device 1 is running a music player application in the background. In the example illustrated in FIG. 7A, the electronic device 1 is running a music player application in the background, and music A is outputted from the earphone 50.

As illustrated in FIG. 7A, the electronic device 1 is running the web browser application in the foreground, and thus accepts a touch operation by the operator and performs a process corresponding to the operation by the web browser application. That is, in the state illustrated in FIG. 7A, the operator performs a touch operation to the touch sensor 11 (an object is displayed on the display unit 14) of the electronic device 1, thereby allowing the web browser application to perform a predetermined process. For example, the operator touches an object indicating an item (headline) of the news article to browse the details of the news article.

Under such a situation, as illustrated in FIG. 7A, when the touch face of the touch sensor 11 is pressed and the control unit 15 detects data based on a press that satisfies a predetermined standard, the electronic device 1 allows, as illustrated in FIG. 7B, the music player application running in the background to perform a predetermined process. In this example, as a predetermined process, a process in which music next to the music being played is selected is defined. Thus, when the music player application running in the background performs a predetermined process, music B, which is the next music of music A, is outputted from the earphone 50, as illustrated in FIG. 7B. That is, as illustrated in FIG. 7A, during running of the web browser application in the foreground, when the operator wants to perform an operation to the music player application running in the background, the operator only needs to operate any position on the touch sensor 11 so that data based on a press that satisfies a predetermined standard is detected.

Such a press operation allows the operator to perform an operation to the music player application as illustrated in FIG. 7B, and thus the operator can immediately perform an operation to the application running in the background. In FIGS. 5A and 5B, an example in which a process for selecting the next music is performed while running the music player application in the background is illustrated, and various processes may be performed depending on the defined predetermined process. For example, in the case of music player, besides a process for selecting the next music, a process for stopping the music being played or for playing the music that is stopped from the beginning may be considered. As such a predetermined process, various processes can be considered depending on the application running in the background.

Third Embodiment

Next, the third embodiment of the present invention will be described. In the third embodiment, based on the same technological idea as that of the above-described first embodiment, measures for preventing operation mistakes on the touch sensor 11 are further taken. The electronic device in accordance with the third embodiment can also be operated by the same configuration as that of the electronic device 1 described in the first embodiment, thus the same description as that for the first embodiment will be appropriately omitted.

In the first and the second embodiments, other than the control to the application running in the background, control to the application running in the foreground is triggered by the detection of a touch by the touch sensor 11. However, in this case, with a light touch of operator's finger and the like, an operation to the application running in the foreground is accepted, which may cause an operation mistake. Therefore, in the present embodiment, the application running in the foreground is controlled to perform a process when data based on a press that satisfies the first standard is detected, and the application running in the background is controlled to perform a process when data based on a press that satisfies the second standard that is higher than the first standard is detected.

Figure 8:
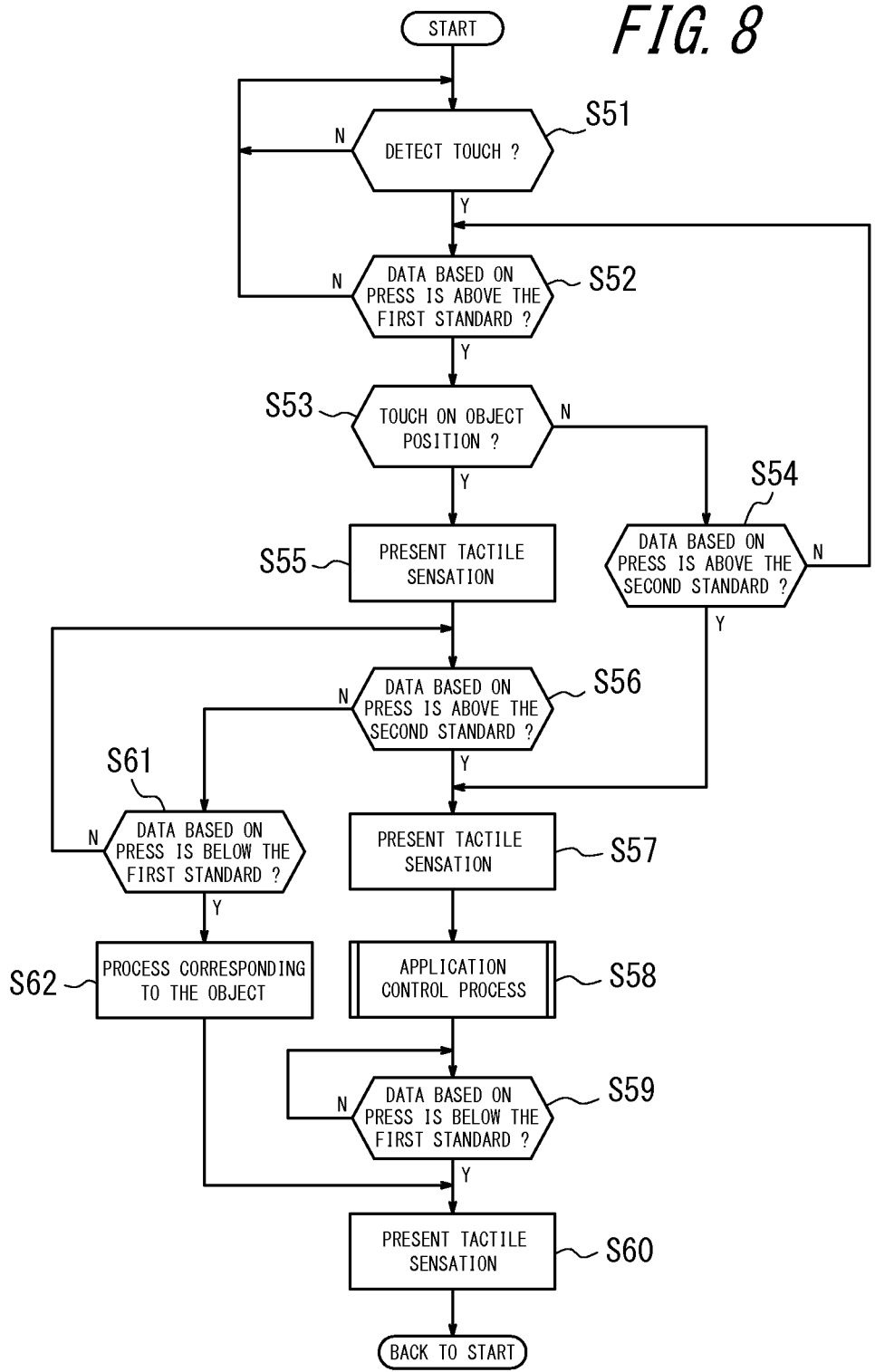
FIG. 8 is a flow chart illustrating a process by the electronic device in accordance with one embodiment.

FIG. 8 is a flow chart illustrating control of an application in response to the operation to the electronic device 1 in accordance with the third embodiment. The electronic device 1 in accordance with the present embodiment, upon detecting data based on a press that satisfies the second standard during acceptance of a usual operation to the touch sensor 11 by data based on a press that satisfies the first standard, switches between any of the applications running in the background and the application running in the foreground. Thus, in the electronic device 1 in accordance with the present embodiment, at a stage where a touch to the touch sensor 11 is accepted, a specific process to the running application is not performed both in the background and in the foreground.

The flow chart illustrated in FIG. 8 includes a usual process in which, if the position on the touch sensor 11 where an operation by data based on a press that satisfies the first standard is detected corresponds to the position of an icon and the like (object) for starting an application, the electronic device 1 starts the application. Incidentally, it is supposed that, when the process illustrated in FIG. 8 is started, the electronic device 1 has already started any application in the foreground. Here, the application to be started may be any application such as, for example, a schedule management application and an e-mail function application.

To start the process illustrated in the flow chart in FIG. 8, before detecting a press operation to the touch face of the touch sensor 11 by the operator by data based on a press that satisfies the first standard, an icon and the like for starting an application and a key and the like for performing an operation are displayed on the display unit 14 of the electronic device 1. The object according to the present embodiment may be an image that suggests a position (region) on which a press operation is accepted to the operator. For example, as an image of object, an image representing a state where the numbers and characters are depicted on a key top is displayed on the display unit 14. The object according to the present embodiment may be an image that suggests to the operator a position (region) on which a touch for performing an operation to the application running in the foreground is detected. For example, as an image of object, an image of icon showing an application to be started is displayed on the display unit 14. In this case, which object is displayed on the display unit 14 and how the object is displayed depend on the application being executed in the foreground at that time.

When the process of the electronic device 1 in accordance with the present embodiment is started, the control unit 15 monitors whether or not the touch sensor 11 has been touched and data based on a press on the touch sensor 11 as well (step S51). At step S51, when the touch sensor 11 detects a touch (touch operation) by a pressing object (pressing matter) such as an operator's finger and a stylus pen, the process moves to step S52.

At step S52, the control unit 15 determines whether or not the data based on the press on the touch sensor 11 is increased by the press of the touch sensor 11 by the operator and satisfies the first standard. Here, it is preferable that, the data based on the press that satisfies the first standard is set previously based on a usual press operation by the operator, and is allowed to be changed later. In order to prevent the data based on the press from being determined as satisfying the first standard when the operator softly touches the touch sensor by accident, setting a very low value as a predetermined standard is avoided. Also, in order to provide the operator with a sense of pressure for a real tactile sensation, in consideration of a usual load of a press by the intention of the operator (e.g. an average value), setting a very low value as the first standard is avoided.

In the case where the touch sensor 11 detects a touch at step S51 and the control unit 15 does not detect the data based on the press that satisfies the first standard at step S52, the process returns to step S51. When the control unit 15 detects the data based on the press that satisfies the first standard at step S52, the control unit 15 determines whether or not the position of a touch detected by the touch sensor 11 corresponds to the position of the object displayed on the display unit 14 (step S53).

At step S53, when the position of the touch detected by the touch sensor 11 does not correspond to the position of the object, the operator has not touched the position on which a predetermined control is performed by the application. In this case, the control unit 15 determines whether or not the data based on the press on the touch sensor 11 is further increased by the press by the operator on the touch sensor 11 and satisfies the second standard (step S54). Here, on the basis of the press by the operator for a usual press operation, it is preferable that data based on a press that satisfies the second standard is set previously so that the data will be slightly higher than that for the usual operation, and the setting may be changed after that. At step S54, when the data based on the press on the touch sensor 11 is determined as not satisfying the second standard, the process returns to step S52 and the control unit 15 continues the process.

On the other hand, at step S53, when the position of a touch detected by the touch sensor 11 corresponds to the position of the object, the control unit 15 notifies the operator that the operation by the data based on the press that satisfies the first standard has been detected based on the intention of the operator. Thus, the control unit 15 drives the tactile sensation presentation unit 13 with a predetermined drive signal and causes the touch sensor 11 to vibrate with a predetermined vibration pattern set previously to present a first tactile sensation (step S55). The first tactile sensation presented at step S55 may be, for example, the tactile sensation of pressing a button described in the first embodiment.

When a tactile sensation is presented at step S55, the control unit 15 determines whether or not the data based on the press on the touch sensor 11 is increased further by the press of the touch sensor 11 by the operator and satisfies the second standard (step S56). When it is determined that the data based on the press on the touch sensor 11 satisfies the second standard at step S56, the control unit 15 drives the tactile sensation presentation unit 13 with a predetermined drive signal and presents a tactile sensation, to notify to the operator that the operation by the data based on the press that satisfies the second standard has been detected (step S57). In addition, the tactile sensation presented at step S57 may be, for example, a tactile sensation of pressing a button as in the case of step S55, however, to notify to the operator that an operation different from that by the data based on the press that satisfies the first standard has been accepted, it is preferable that the tactile sensation is different from that of pressing a button or that of releasing a finger and the like from the button.

When a tactile sensation is presented at step S57, the control unit 15 performs an application control process of step S58. The application control process performed at step S58 is the same as that of step S17 illustrated in FIG. 3, and more specifically, the same process illustrated in FIG. 4 or FIG. 6 is performed. That is, in an aspect in which any of the applications running in the background is switched to be run in the foreground, the application control process illustrated in FIG. 4 is performed. Moreover, in an aspect in which a predetermined process is performed by any of the applications running in the background while the application is running in the background, the application control process illustrated in FIG. 6 is performed.

After the application control process is performed at step S58, the control unit 15 determines whether or not the data based on the press on the touch sensor 11 is below the first standard (step S59). That is, at step S59, whether or not the operator presses the touch sensor 11 with a less force is determined.

When the data based on the press on the touch sensor 11 is below the first standard at step S59, the control unit 15 drives the tactile sensation presentation unit 13 with a predetermined drive signal and causes the touch sensor 11 to vibrate with a predetermined vibration pattern set previously to present a second tactile sensation (at step S60). The tactile sensation presented here is to notify to the operator that the application control process has been appropriately performed. The second tactile sensation may be, as in the case of the first embodiment, the same as the first tactile sensation presented at step S55. In addition, when the first tactile sensation is a tactile sensation of pressing a button, the second tactile sensation may be different from the first tactile sensation, and may be a tactile sensation of releasing a finger and the like from a button.

On the other hand, when it is determined that the data based on the press on the touch sensor 11 does not satisfy the second standard at step S56, the control unit 15 determines whether or not the data based on the press on the touch sensor 11 is below the first standard (step S61). That is, at step S61, whether or not the operator presses the touch sensor 11 with a less force is determined.

When the data based on the press on the touch sensor 11 is not below the first standard at step S61, the process returns to step S56 and the control unit 15 continues the process. When the data based on the press on the touch sensor 11 is below the first standard at step S61, the control unit 15 performs a process corresponding to the object on the position on which a press operation has been detected (step S62). The process corresponding to the object performed at step S62 is as with step S15 illustrated in FIG. 3. That is, the process is defined by the application running in the foreground at that time. When the process corresponding to the object is performed at step S62, process moves to step S60 and the control unit 15 performs a process for the case where a press operation by the operator is cancelled.

When it is determined that the data based on the press on the touch sensor 11 satisfies the second standard at step S54, the control unit 15 presents a tactile sensation at step S57, and performs the application control process of step S58. That is, also in the present embodiment, the electronic device 1 accepts a press operation by the data based on the press that satisfies the second standard on any position of the touch sensor 11, thereby performing the application control process. Therefore, when the operator wants to control the application running in the background, the operator operates any position on the touch sensor 11 so that data based on a press that satisfies the second standard is detected.

Thus, according to the present embodiment, as a control to the application running in the background, the same effect as that obtained by the above-described first and second embodiments can be obtained. Further, an operation in which the touch sensor is touched softly by something is not considered as a substantial operation. Therefore, the electronic device 1 in accordance with the present embodiment can reduce the operation mistake by the operator.

Fourth Embodiment

The electronic devices 1 employed in the above-described first to third embodiments are described on the assumption that they perform multi-tasking process. However, the present invention can be applied not only to the multi-tasking electronic device but also to the single-tasking electronic device. The electronic device in accordance with the fourth embodiment can be operated as a single-tasking electronic device having the same configuration as that of the electronic device 1 described in the first embodiment, thus the same description as that of the first embodiment is appropriately omitted.

Figure 9:
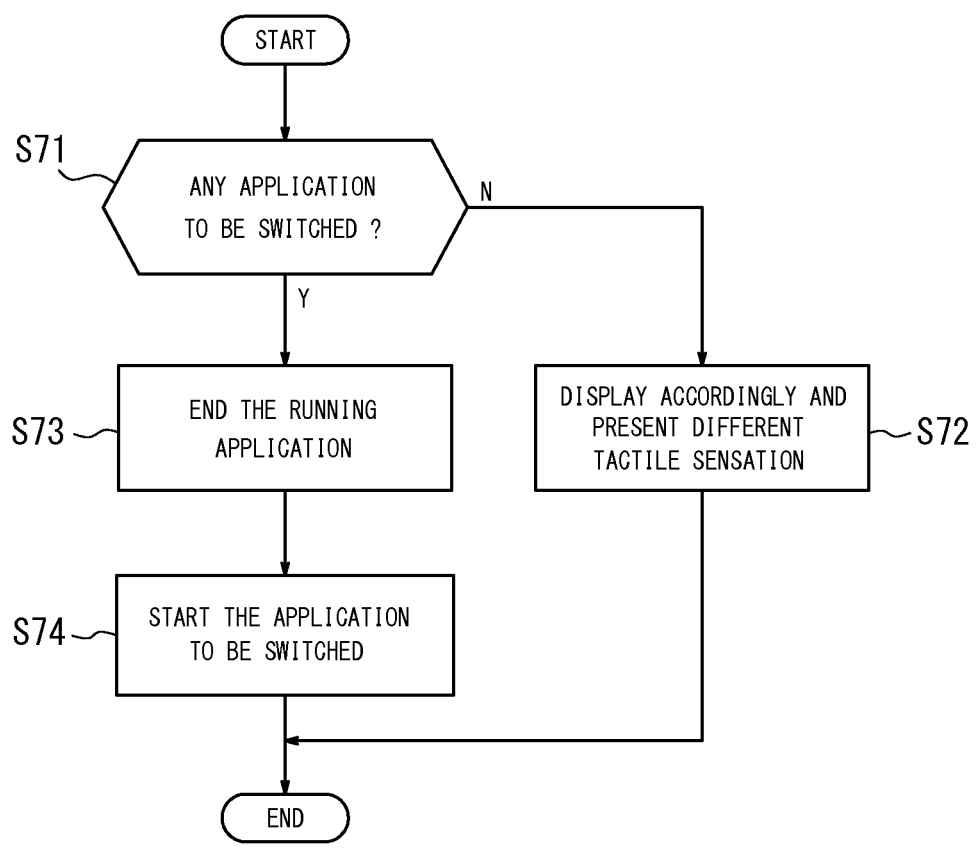
FIG. 9 is a flow chart illustrating a detailed application control process by the electronic device in accordance with one embodiment.

In the present embodiment, a process is performed in accordance with the flow charts illustrated in FIG. 3 or FIG. 8, and the application control process illustrated in FIG. 9 is performed at step S17 of FIG. 3 or step S58 of FIG. 8. As described above, a single-tasking electronic device does not run a plurality of applications simultaneously. Thus, in the case of a single-tasking electronic device, during running of a specific application, an application which is likely to be cooperative with (to be switched and run) the application may be previously defined, and the defined application is run during process of step S17 or step S58. Further, when the control unit 15 detects data based on a press that satisfies a predetermined standard, the data based on the press may be detected according to stage, and an application corresponding to each standard of the predetermined stages may be previously defined.

FIG. 9 is a flow chart illustrating the application control process performed at step S17 of FIG. 3 or step S59 of FIG. 8 when the single-tasking electronic device performs a process in accordance with the flow chart illustrated in FIG. 3 or FIG. 8. When the application control process according to the present embodiment is started, the control unit 15 first determines whether or not, besides the running application, there is any application to be switched with the application and to be run (step S71).

If there is no application to be switched at step S71, the control unit 15 displays a message indicating "no application to be switched" on the display unit 14 to notify the operator of it (step S72). In addition, at this time, the control unit 15 may drive the tactile sensation presentation unit 13 to present a tactile sensation that is different from the above-described tactile sensation of pressing a button to notify to the operator that there is no application to be switched. Thus, after notifying the operator of no application to be switched at step S72, the control unit 15 ends the application control process according to the present embodiment.

On the other hand, when there is an application to be switched at step S71, the control unit 15 ends the running application once (step S73). Next, the control unit 15 starts the application that has been defined to be switched (at step S74), and after that, ends the application control process according to the present embodiment.

Thus, according to the present embodiment, during run of an application using a single-tasking electronic device, easy and quick switching to another application can be performed.

The present invention is not limited to the above-mentioned embodiments, and various modifications and variations can be made. For example, in any of the above-described first to third embodiments, in a multi-tasking electronic device, an application running in the background is controlled. However, in the present invention, application switching can be performed not only based on running either in foreground or background, but based on either active or inactive application.

That is, for example, in the above-described first embodiment, the control unit 15 can, upon detecting data based on a press that satisfies a predetermined standard, control any of the inactive applications to be activated. Further, in this case, the control unit 15 may, each time it detects data based on a press that satisfies a predetermined standard, also control, any of the inactive applications to be activated in a sequential manner, in accordance with a predetermined order. Further, in the above-described case, the control unit 15 can, upon detecting the data based on a press that satisfies a standard of a predetermined stage, also control any of the inactive applications that correspond to the standard of the predetermined stage to be activated.

The present invention may be configured to control an inactive application depending not on either the application running in the foreground or the background, but depending on either active application or inactive application. That is, for example, in the above-described second embodiment, the control unit 15 may, upon detecting the data based on a press that satisfies a predetermined standard, control any of the inactive applications to perform a predetermined process. Also, in this case, the control unit 15 can, upon detecting the data based on a press that satisfies a standard of a predetermined stage, control, among the inactive applications, an application that corresponds to the standard of the predetermined stage to perform a predetermined process.

The press detection unit according to the above-described each embodiment may be configured using any number of strain gauge sensors. Moreover, for such a press detection unit, various configurations may be considered depending on the touch detection type of the touch panel. For example, in the case of a resistive film type, the magnitude of the resistance according to the size of the contact area is associated with the load (force) of press on the touch face of the touch panel, and thus a touch detection unit can be configured not using a strain gauge sensor, a piezoelectric element and the like. In the case of a capacitive type, the magnitude of the capacitance is associated with the load (force) of press on the touch face of the touch panel, and thus a touch detection unit may be configured not using a strain gauge sensor, a piezoelectric element and the like.

The tactile sensation presentation unit may be configured by using any number of piezoelectric vibrators, by providing a transparent piezoelectric elements over the whole surface of the touch sensor, or if vibration presenting a tactile sensation can be represented, by rotating an eccentric motor once per one cycle of a drive signal. Further, when the press detection unit and the tactile sensation presentation unit are configured using a piezoelectric element, the piezoelectric element may be commonly used to configure a press detection unit and tactile sensation presentation unit.

Incidentally, the electronic device in accordance with the present invention drives the tactile sensation presentation unit when data based on a press on the touch sensor 11 satisfies a standard for presenting a tactile sensation. The above-mentioned "when the data based on a press on the touch sensor 11 satisfies a standard for presenting a tactile sensation" may be when the data based on the press on the touch sensor 11 reaches a standard value at which the data based on the press on the touch sensor 11 presents a tactile sensation, or when the data based on the press on the touch sensor 11 exceeds the standard value at which the data based on the press on the touch sensor 11 presents a tactile sensation. Further, the above-mentioned when the data based on the press on the touch sensor 11 satisfies the standard for presenting the tactile sensation may be when a standard value at which a tactile sensation is presented is detected by the press detection unit.

In the present invention, instead of presenting a tactile sensation or with a tactile sensation, notification to the operator may be made with sound.

REFERENCE SIGNS LIST 11 touch sensor
11a touch face
12 press detection unit
13 tactile sensation presentation unit
14 display unit
15 control unit
21 housing
22 insulator
23 upper cover
24 insulator
31 strain gauge sensor
32 piezoelectric vibrator
50 earphone

The invention claimed is:

1. An electronic device comprising:
a touch sensor;
a press detector configured to output data based on a press on the touch sensor; and
a control unit configured to control, each time when the data based on the press satisfies a predetermined standard, one of applications running in background to be switched in a predetermined order with an application running in foreground, and to determine, when the data based on the press does not satisfy the predetermined standard, whether a position of the press corresponds to a position of an object on a display,
wherein an application running in foreground displays a respective user interface that can be directly interacted with by a user, whereas an application running in background does not display a respective user interface unless switched to foreground.

2. The electronic device according to claim 1, wherein the control unit controls, each time the control unit detects the data based on the press that satisfies the predetermined standard, any of the applications running in the background to be sequentially switched with the application running in the foreground, in accordance with the predetermined order.

3. The electronic device according to claim 1, wherein the control unit controls, upon detecting the data based on the press that satisfies the standard of a predetermined stage, an application corresponding to the standard of the predetermined stage among those running in the background to be switched with the application running in the foreground.

4. An electronic device, comprising:
a touch sensor;
a press detector configured to output data based on a press on the touch sensor; and
a control unit configured to control, each time when the data based on the press satisfies a predetermined standard, one of applications running in background in a predetermined order to perform a predetermined process, and to determine, when the data based on the press does not satisfy the predetermined standard, whether a position of the press corresponds to a position of an object on a display,
wherein an application running in foreground displays a respective user interface that can be directly interacted with by a user, whereas an application running in background does not display a respective user interface unless switched to foreground.

5. The electronic device according to claim 4, wherein the control unit controls, upon detecting the data based on the press that satisfies the standard of a predetermined stage, an application corresponding to the standard of the predetermined stage among those running in the background to perform the predetermined process.

6. An electronic device, comprising:
a touch sensor;
a press detector configured to output data based on a press on the touch sensor; and
a control unit configured to control, each time when the data based on the press satisfies a predetermined standard, one of inactive applications to be activated in a predetermined order, and to determine, when the data based on the press does not satisfy the predetermined standard, whether a position of the press corresponds to a position of an object on a display,
wherein an activated application is an application that is currently performing operations, whereas an inactive application is an application that performs no operations unless activated.

7. The electronic device according to claim 6, wherein the control unit controls, each time the control unit detects the data based on the press that satisfies the predetermined standard, any of the inactive applications to be sequentially activated in accordance with the predetermined order.

8. The electronic device according to claim 6, wherein the control unit controls, upon detecting the data based on the press that satisfies the standard of a predetermined stage, an application corresponding to the standard of the predetermined stage among inactive applications to be activated.

9. An electronic device, comprising:
a touch sensor;
a press detector configured to output data based on a press on the touch sensor; and
a control unit configured to control, each time when the data based on the press satisfies a predetermined standard, one of inactive applications in a predetermined order to perform a predetermined process, and to determine, when the data based on the press does not satisfy the predetermined standard, whether a position of the press corresponds to a position of an object on a display,
wherein an activated application is an application that is currently performing operations, whereas an inactive application is an application that performs no operations unless activated.

10. The electronic device according to claim 9, wherein the control unit controls, upon detecting the data based on the press that satisfies the standard of the predetermined stage, an application corresponding to the standard of the predetermined stage among inactive applications to perform the predetermined process.

11. The electronic device according to claim 9, wherein each application includes a plurality of objects with each object being either: (1) a visual representation at a respective position that, if touched, causes a respective operation of the application to be performed, or (2) a specified region of the user interface where information is displayed.

12. The electronic device according to claim 9, further comprising a display in which only one application is displayed at a time.

13. The electronic device according to claim 1, wherein each application includes a plurality of objects with each object being either: (1) a visual representation at a respective position that, if touched, causes a respective operation of the application to be performed, or (2) a specified region of the user interface where information is displayed.

14. The electronic device according to claim 1, further comprising a display in which only one application is displayed at a time.

15. The electronic device according to claim 6, wherein each application includes a plurality of objects with each object being either: (1) a visual representation at a respective position that, if touched, causes a respective operation of the application to be performed, or (2) a specified region of the user interface where information is displayed.

16. The electronic device according to claim 6, further comprising a display in which only one application is displayed at a time.

* * * * *